United States Patent
Davenport

Patent Number: 5,984,814
Date of Patent: Nov. 16, 1999

[54] VARIABLE RATIO CHAIN DRIVE TRANSMISSION

[76] Inventor: Bruce Davenport, RR1 R19, Bowen Island, British Columbia, Canada, V0N 1G0

[21] Appl. No.: 08/923,430

[22] Filed: Sep. 4, 1997

[51] Int. Cl.⁶ .............................. F16H 59/00; F16H 9/10
[52] U.S. Cl. ................................................ 474/50; 474/57
[58] Field of Search .................................. 474/47, 49, 50, 474/56, 57

[56] References Cited

U.S. PATENT DOCUMENTS

| | | |
|---|---|---|
| 3,995,508 | 12/1976 | Newell . |
| 4,023,424 | 5/1977 | Ryan et al. . |
| 4,030,373 | 6/1977 | Leonard . |
| 4,498,351 | 2/1985 | Ahoor . |
| 4,516,960 | 5/1985 | Rathert . |
| 4,530,676 | 7/1985 | Leonard . |
| 4,598,920 | 7/1986 | Dutil et al. . |
| 4,634,406 | 1/1987 | Hufschmid . |
| 4,645,475 | 2/1987 | Husted . |
| 4,740,190 | 4/1988 | Pike . |
| 4,741,546 | 5/1988 | Reswick . |
| 4,787,879 | 11/1988 | Pritchard . |
| 4,816,008 | 3/1989 | Leonard . |
| 4,832,660 | 5/1989 | Leonard . |
| 4,836,046 | 6/1989 | Chappel . |
| 4,850,939 | 7/1989 | Chilcote et al. . |
| 5,013,284 | 5/1991 | Leonard . |
| 5,041,061 | 8/1991 | Leonard . |
| 5,318,486 | 6/1994 | Lutz . |
| 5,476,422 | 12/1995 | Schendel . |
| 5,492,506 | 2/1996 | Lorance . |
| 5,520,583 | 5/1996 | Balingit et al. . |

FOREIGN PATENT DOCUMENTS

| | | |
|---|---|---|
| 0 524 709 | 1/1993 | European Pat. Off. . |
| 430 695 | 2/1948 | Italy . |
| 55-86948 | 7/1980 | Japan . |
| 1 532 189 A1 | 12/1989 | U.S.S.R. . |
| 2 239 063 | 6/1991 | United Kingdom . |

*Primary Examiner*—Tamara L. Graysay
*Assistant Examiner*—Matthew A. Kaness
*Attorney, Agent, or Firm*—Oyen Wiggs Green & Mutala

[57] ABSTRACT

A chain drive transmission has a variable diameter sprocket. The sprocket has a number of sectors which can be moved radially relative to a hub of the sprocket. The sectors are biased outwardly but can be pulled inwardly by flexible members which wind around a spool. The spool is, in turn connected to an axially movable shifting member. The gear ratio of the transmission can be changed by either allowing the shifting member to move axially outwardly, in which case the effective diameter of the variable diameter sprocket increases, or by momentarily braking rotation of the shifting member, in which case the flexible members are wound onto the spool thereby reducing the effective diameter of the variable sprocket. Shifting between gear ratios may be done with a simple rugged mechanism. Shifting between gear ratios requires little force and can be controlled with an electromechanical actuator. Both driving and driven sprockets in a power transmission may be variable diameter sprockets.

31 Claims, 12 Drawing Sheets

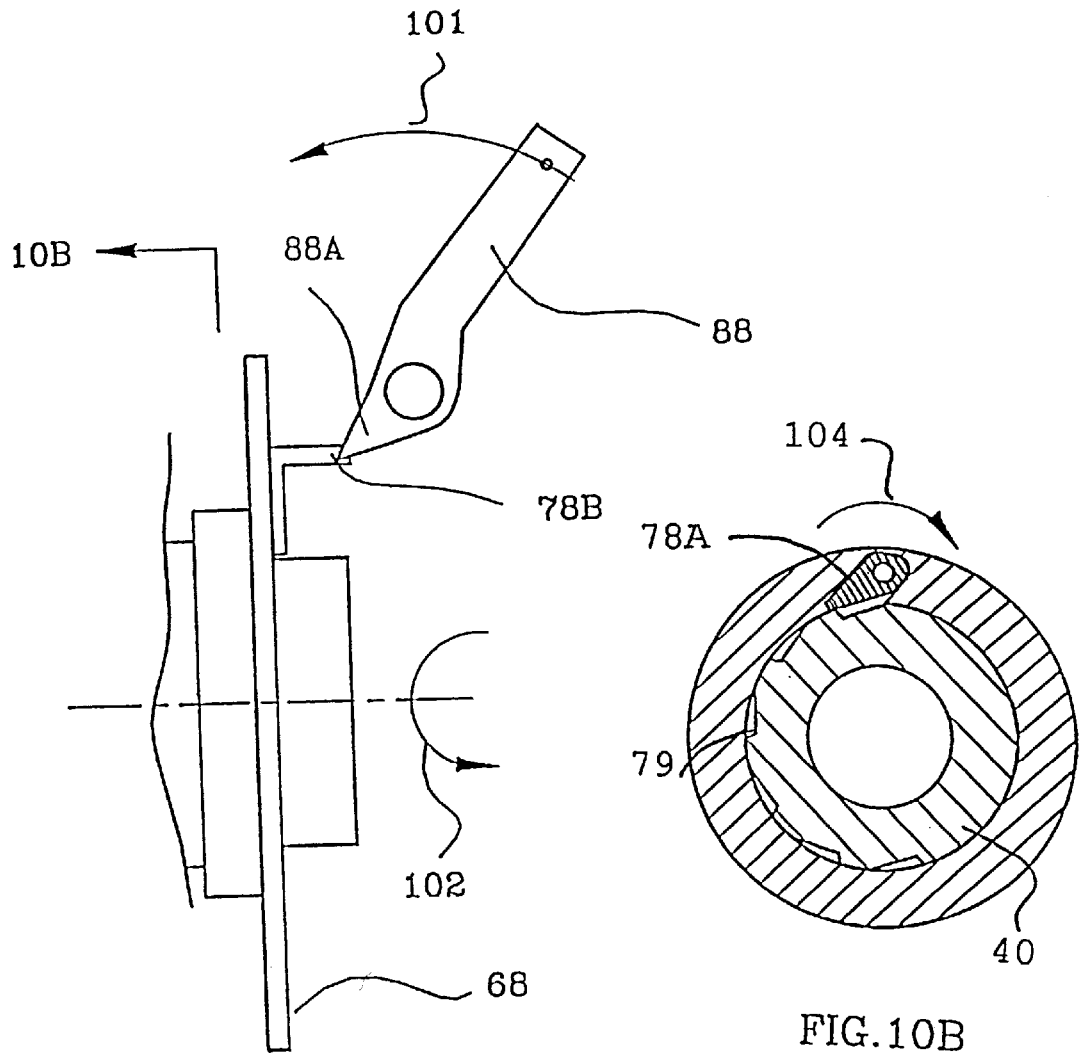
FIG.10B
FIG.10A
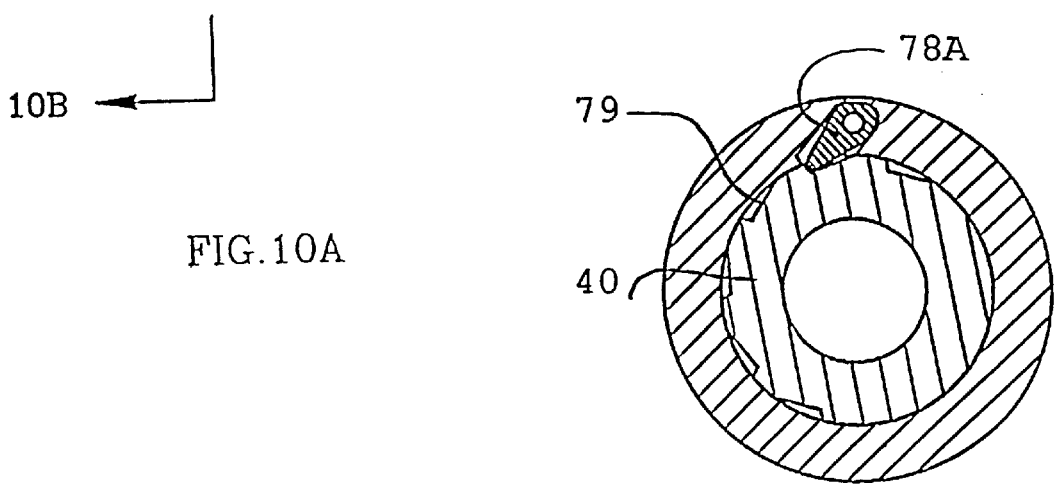
FIG.10C

VARIABLE RATIO CHAIN DRIVE TRANSMISSION

TECHNICAL FIELD

This invention relates to a variable ratio transmission and, in particular, to a variable ratio transmission which includes a sprocket having a variable effective diameter. The transmission has particular application in bicycle drive trains but may be used in other contexts where a variable ratio transmission is required.

BACKGROUND

Multi-speed bicycles typically have drive trains comprising a chain which passes around one sprocket in each of a front set of sprockets and a rear set of sprockets. A derailleur mechanism allows a rider to selectively move the chain to a different one of the sprockets in each set of sprockets. This enables the rider to select a gear ratio which is most appropriate for the current riding conditions.

One disadvantage of derailleur type transmissions is that it is only possible to increase the number of gear ratios offered by increasing the number of sprockets in one or both of the sprocket sets. The result is that the chain often extends at an angle between the front and rear sprocket sets. This is undesirable because it reduces the efficiency of the chain drive and places undesirable stresses on the entire drive train.

Another disadvantage of currently available derailleur systems is that they do not always shift smoothly under load, for example, when a rider is riding a bicycle up a hill. A further disadvantage of some derailleur type multi-speed transmissions is that a significant amount of force is generally required to shift the chain between adjacent sprockets in one of the sets of sprockets. Therefore, if it is desired to automate the shifting function by controlling shifting with a computer controlled actuator, for example, the actuator must be capable of supplying the necessary force. Consequently, an expensive and typically power hungry actuator is required. The result is that electronically controlled automatic derailleur type transmissions have not been widely accepted.

There have been many suggestions of alternative variable ratio transmissions suitable for use in bicycles. Many such transmissions include a "variable diameter sprocket." In these transmissions, one of the front and rear groups of sprockets is replaced with a segmented sprocket. The segmented sprocket has a number of radially movable segments which engage the chain. By moving the segments inwardly or outwardly, the effective diameter of the segmented sprocket can be changed, thereby varying the gear ratio of the transmission.

Some examples of transmissions which employ a segmented sprocket are shown in Hufschmidt, U.S. Pat. No. 4,634,406; Gummeringer, U.S. Pat. No. 4,696,662; Pritchard, U.S. Pat. No. 4,797,879; Husted, U.S. Pat. No. 4,810,235; Schendel, U.S. Pat. No. 5,476,422; Pike, U.S. Pat. No. 4,740,190; Husted, U.S. Pat. No. 4,645,475; Rathert, U.S. Pat. No. 4,516,960; Leonard, U.S. Pat. No. 4,030,373; Leonard, U.S. Pat. No. 4,816,008; Newell, U.S. Pat. No. 3,995,508; Dutil et al., U.S. Pat. No. 4,598,920; Chappel, U.S. Pat. No. 4,836,046; Japanese Patent Disclosure No. 55-86948; and Chilcote et al., U.S. Pat. No. 4,850,039. These variable sprocket transmissions use various schemes to cause the sprocket segments to move inwardly or outwardly to vary the drive ratio provided by the transmission. Most of these transmissions have not been commercially acceptable, either because they are inordinately complicated, too heavy, insufficiently robust, inefficient, or are not well suited to automation with low powered actuators. Some prior art transmissions of this general type select gear ratios automatically and do not permit a user to select a ratio different from the automatically selected ratio manually. Currently available multi-ratio chain drive transmissions for non-bicycling applications have similar limitations.

What is needed is a reasonably simple variable ratio transmission which is reasonably light in weight, yet reasonably robust, reasonably inexpensive to fabricate and readily shifted from one ratio to another.

SUMMARY OF THE INVENTION

One aspect of the invention provides a variable diameter sprocket assembly for a power transmission. The sprocket assembly comprises a hub mountable for rotation on a frame; a plurality of sectors mounted to and radially displaceable relative to the hub, the sectors biased away from the hub and adapted to engage a flexible drive member; and, a shifting mechanism. The shifting mechanism comprises a shifting member on the hub, the shifting member movable axially in a first direction in response to rotation relative to the hub in a first sense and movable axially in a second direction opposite to the first direction in response to rotation relative to the hub in a second sense; a plurality of first members, each first member having one end connected to one of the sectors and another end coupled to the shifting member, wherein rotation of the shifting member in the first sense draws the sectors toward the hub and rotation of the shifting member in the second sense allows the sectors to move away from the hub; a releasable releasable holding means for preventing the shifting member from moving in the second direction; and, a brake mountable on the frame for causing the shifting member to turn in the first sense relative to the hub by braking rotation of the shifting member relative to the frame. The flexible member typically comprises a roller chain. The sectors each typically comprise one or more teeth adapted to engage a roller chain.

Another aspect of the invention provides a transmission comprising a variable diameter driving sprocket a drive chain engaging sectors on the variable sprocket; a driven sprocket engaging the drive chain; and a tensioning mechanism to take up slack in the drive chain. The driving sprocket comprising a hub mounted for rotation on a frame; a plurality of sectors mounted to and radially displaceable relative to the hub, the sectors biased away from the hub and adapted to engage a flexible drive member; and, a shifting mechanism. The shifting mechanism comprises: a shifting member threadedly engaged with the hub, the shifting member movable axially in a first direction in response to rotation relative to the hub in a first sense and movable axially in a second direction opposite to the first direction in response to rotation relative to the hub in a second sense; a plurality of first members, each first member having one end connected to one of the sectors and another end coupled to the shifting member, wherein rotation of the shifting member in the first sense draws the sectors toward the hub and rotation of the shifting member in the second sense allows the sectors to move away from the hub; and, a control means. The control means comprises: a holding mechanism for blocking the shifting member from moving in the second direction; and, a brake on the frame for causing the shifting member to turn in the first sense relative to the hub by braking rotation of the shifting member relative to the frame. In a preferred embodiment of the invention the driven sprocket is also a variable diameter sprocket.

Yet another aspect of the invention provides a variable diameter sprocket assembly for use in a power transmission. The sprocket assembly comprises: a hub mountable for rotation on a frame; a plurality of sectors mounted to and radially displaceable relative to the hub, the sectors biased away from the hub and including grips adapted to engage a flexible drive member; a locking mechanism associated with each sector, the locking mechanism movable between a locked position wherein radially inward motion of the sector is prevented and an unlocked position wherein the sector can be moved radially inwardly; and, a shifting mechanism. The shifting mechanism comprises: a plurality of resiliently extendable first members, each first member extending between one of the sectors and a spool mounted for rotation on the hub wherein rotation of the spool member in a first sense draws the sectors toward the hub and subsequent rotation of the shifting member in a second sense allows the sectors to move away from the hub; a shifting member on the hub, the shifting member connected for rotation with the spool, the shifting member movable axially in a first direction in response to rotation relative to the hub in the first sense and movable axially in a second direction opposite to the first direction in response to rotation relative to the hub in the second sense; a releasable holding mechanism for preventing the spool from rotating in the second sense; and, a braking mechanism for briefly causing the shifting member to turn in the first sense relative to the hub.

The holding mechanism preferably comprises a one way clutch associated with the hub and the shifting member. The one-way clutch preferably comprises a release arm and the sprocket assembly comprises a release member having a disengaged position wherein the release member does not contact the release arm and an engaged position wherein the release member can displace the release arm to permit motion of the spool in the second sense. In a preferred embodiment the release arm comprises a bar extending axially outwardly from the shifting member and the one way clutch comprises a pawl pivotally mounted to the shifting member, the pawl engageable with one of a plurality of ratchet teeth on the hub.

The braking mechanism preferably comprises a braking member pivotally mounted to a frame adjacent the shifting member, the braking member engageable with the shifting member. Preferably the braking member comprises a stepped edge, the edge comprising a plurality of steps each one of the steps comprising an edge engageable in a notch in the shifting member when the shifting member is at an axial position corresponding to the one of the steps.

Preferably the locking mechanism comprises a movable locking member in each sector, the locking member comprising a hook which can be engaged or disengaged with lock teeth on members connected to the hub and bias means biasing the locking member toward a position wherein the hook is disengaged with the lock teeth. Most preferably, in each sector, the grip is connected to the locking member so that the locking member is moved to engage the hook with the lock teeth when the grip is exerting force on a flexible member.

BRIEF DESCRIPTION OF THE DRAWINGS

Drawings which illustrate preferred embodiments of the invention but should not be construed so as to limit the spirit or scope of the invention are appended hereto. In the drawings.

DETAILED DESCRIPTION

Figure 1:
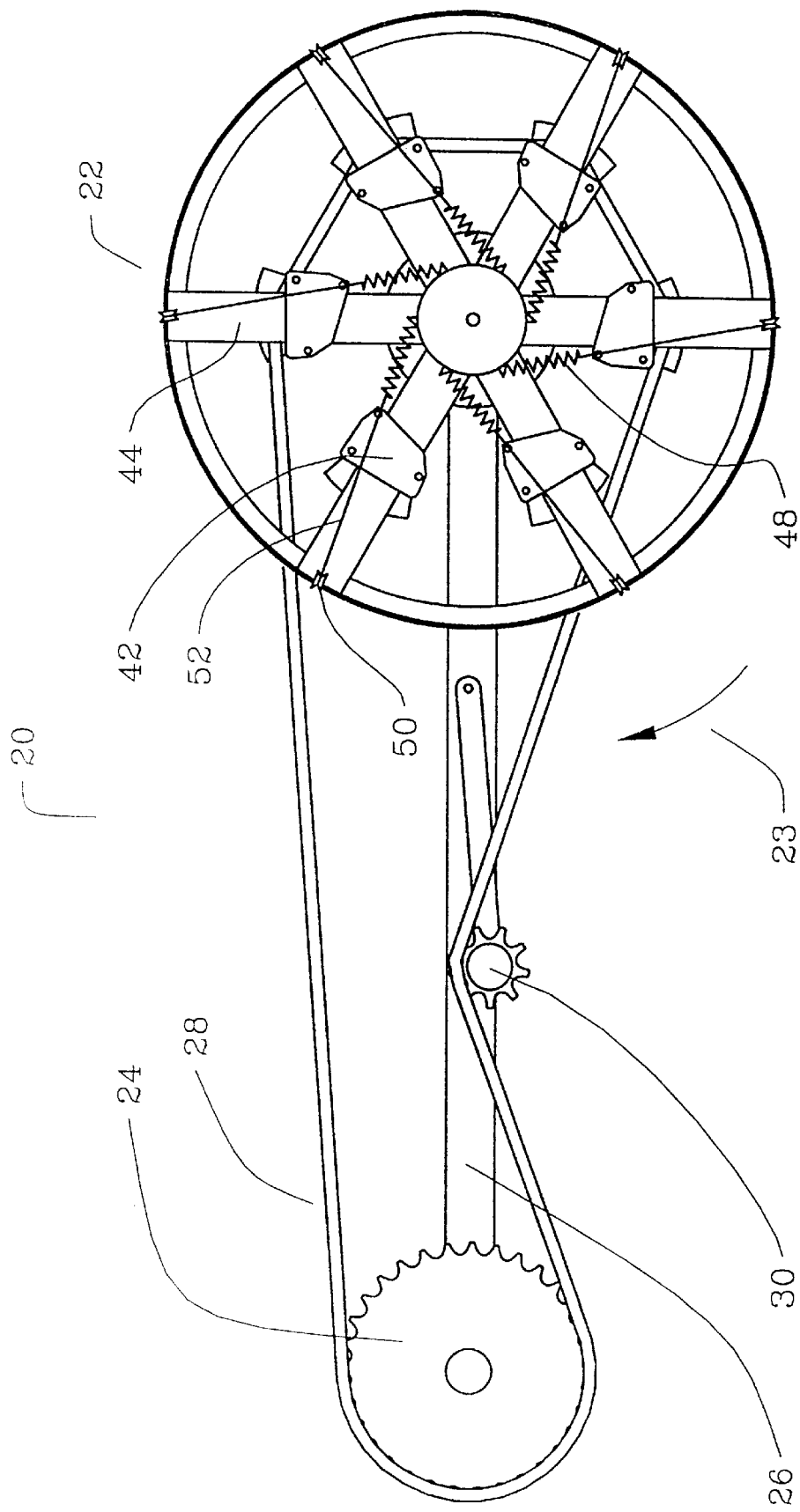
FIG. 1 is a partially schematic side elevational view of a drive train according to the invention with some components omitted for clarity.

FIG. 1 shows a chain drive transmission 20 according to the invention. Transmission 20 has a variable sprocket 22 and a fixed sprocket 24, both of which are pivotally mounted to a frame 26. A flexible drive member, which is preferably a roller chain 28, but may also be a belt or the like, positively engages each of sprockets 22 and 24. A tensioner 30 is provided to take up slack in chain 28 as the ratio of transmission 20 is varied. Sprocket 24 may be caused to rotate by rotating sprocket 22 in the direction indicated by arrow 23.

A second variable sprocket would preferably be used in place of fixed sprocket 24. Only a single variable sprocket is shown in FIG. 1 for simplicity. If only one variable sprocket 22 is used then the variable sprocket could be either the driven sprocket or the driving sprocket of transmission 20. Typically, as described below, driving and driven sprockets have slight differences in construction.

Figure 2A:
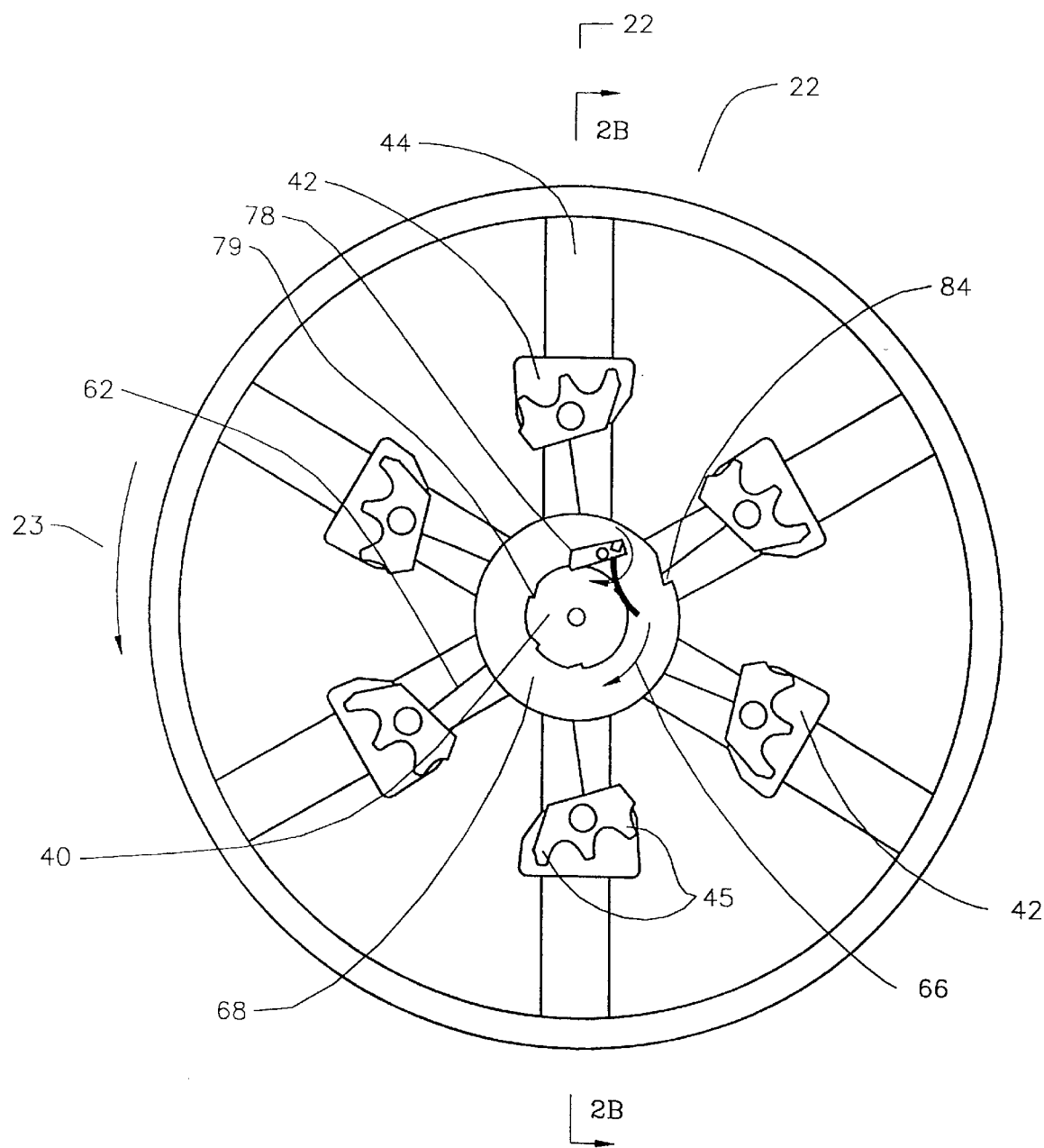
FIG. 2A is a schematic side elevational view of a variable diameter sprocket according to the invention.
Figure 2B:
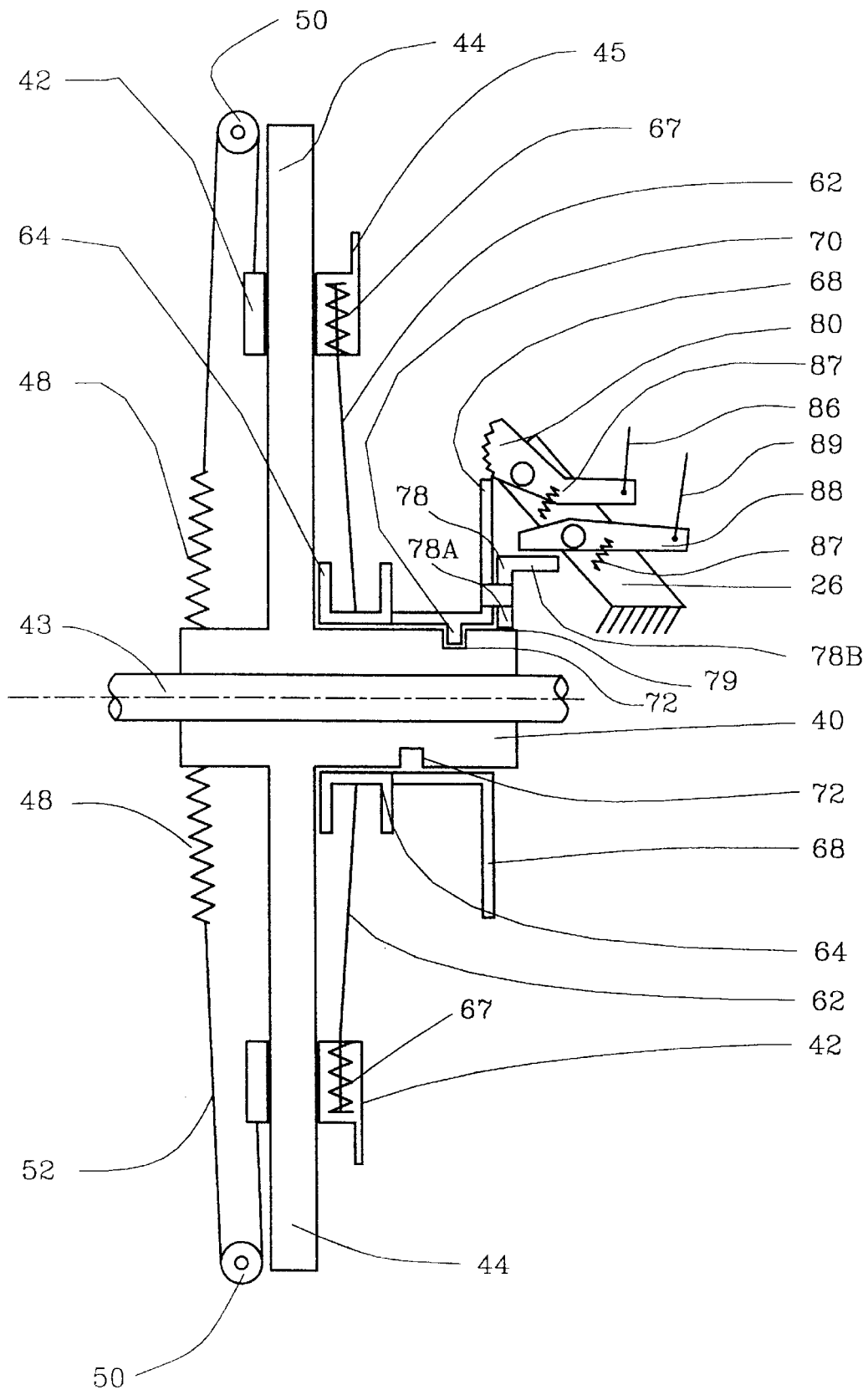
FIG. 2B is a schematic transverse sectional view on the lines 2B—2B through the variable sprocket of FIG. 2A and showing a shifting mechanism.

As shown in FIGS. 2A and 2B, which are simplified schematic views (with some components not shown for clarity), variable sprocket 22 comprises a hub 40. A plurality of sectors 42 are mounted to hub 40 in a manner which permits their radial displacements from an axis of rotation 43 of hub 40 to be varied. In the embodiment shown in FIGS. 2 and 3, sectors 42 slide on arms 44 which extend radially from hub 40. In the alternative, sectors 42 could slide in slots in a broad flange projecting from hub 40 or could be mounted in some other way which allows their radial distance from axis 43 to be adjusted. Each sector 42 has a grip for positively engaging chain 28 (or another type of flexible drive member). The grip preferably comprises a plurality of teeth 45 facing radially outwardly on each sector 42 and positioned to engage chain 28. Most preferably a chain guide 46 (FIG. 4) is provided to guide chain 28 into engagement with teeth 45 as variable sprocket 22 turns.

When sectors 42 are radially displaced outwardly from hub 40 then the effective diameter of variable sprocket 22 is increased. When sectors 42 are displaced inwardly toward hub 40 then the effective diameter of variable sprocket 22 is decreased. The mechanical advantage provided by transmission 20 may therefore be adjusted by moving sectors 42 to a desired radial distance from axis 43.

Figure 4:
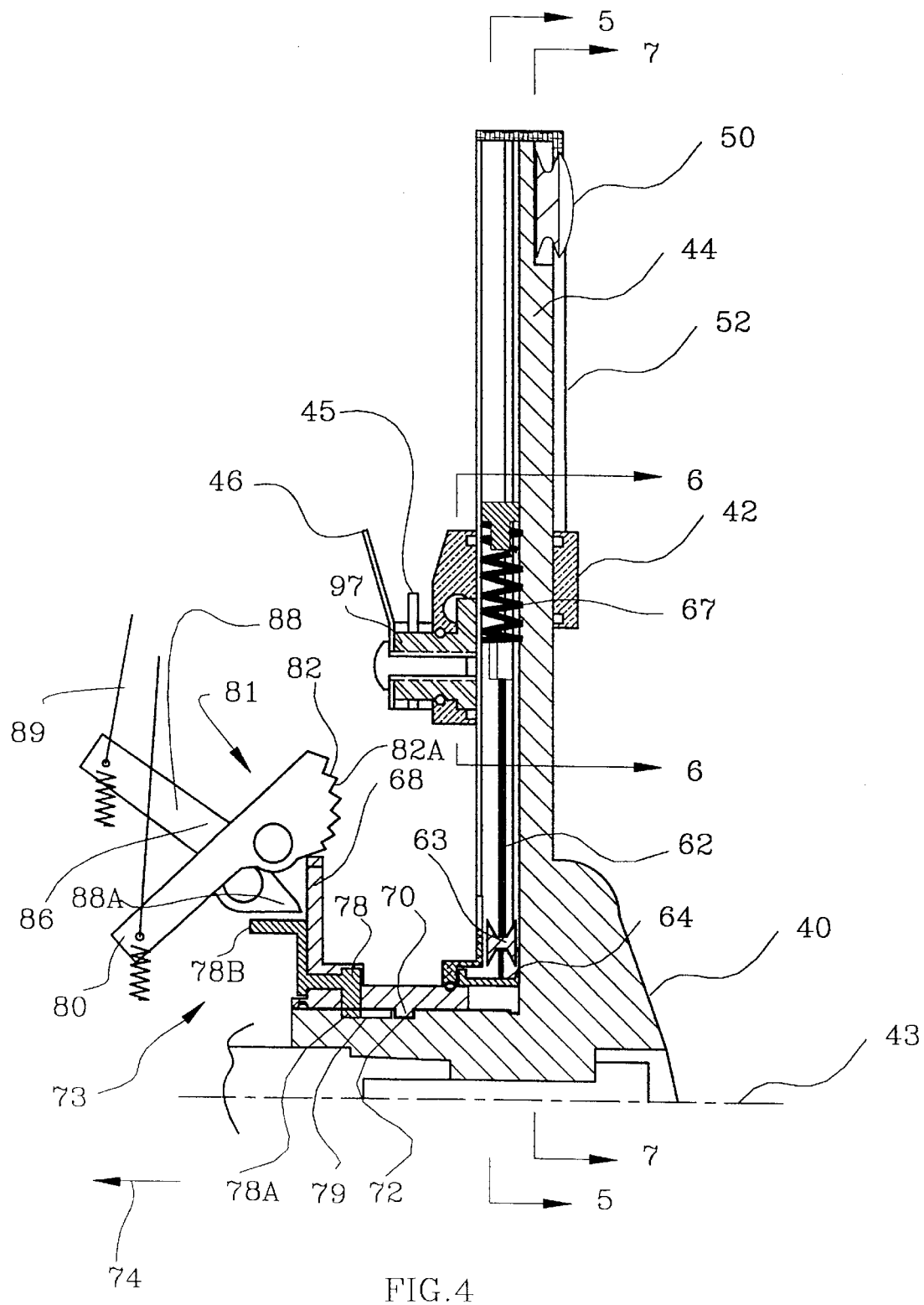
FIG. 4 is a transverse sectional view along the lines 4—4 of the sprocket of FIG. 3.

Sectors 42 are biased radially outwardly with respect to hub 40 by a bias means. In the embodiments shown in the drawings, the bias means comprises springs 48 which each have one end connected to hub 40 and another end connected to one of sectors 42 by a flexible member 52. Flexible members 52 pass over pulleys 50 at the radially outward ends of arms 44. While pulleys 50 in FIG. 2B are shown schematically as being mounted so that they carry flexible members 52 transversely, pulleys 50 are preferably large in diameter and mounted with their axes at an angle to the plane defined by arms 44, as shown in FIG. 4. This tends to allow flexible members 52 to move more easily without unduly increasing the thickness of variable sprocket 22.

Figure 7:
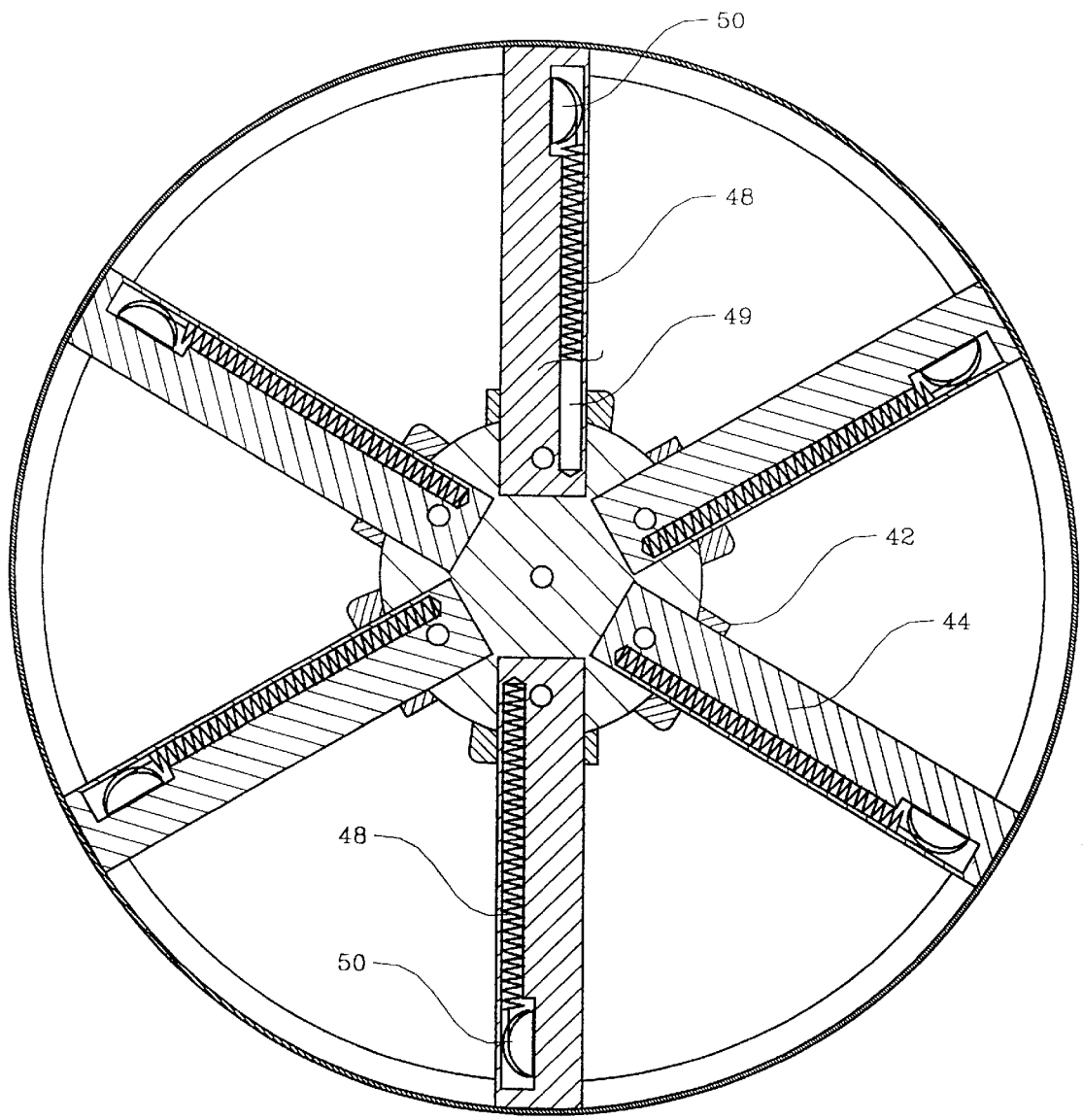
FIG. 7 is a longitudinal sectional view along the lines 7—7 through the sprocket of FIG. 4.

Flexible members 52 may comprise, for example, thin flexible cables. Preferably springs 48 are protected from the elements. For example, springs 48 may extend inside radially extending channels 49 inside arms 44 (FIG. 7).

Figure 5:
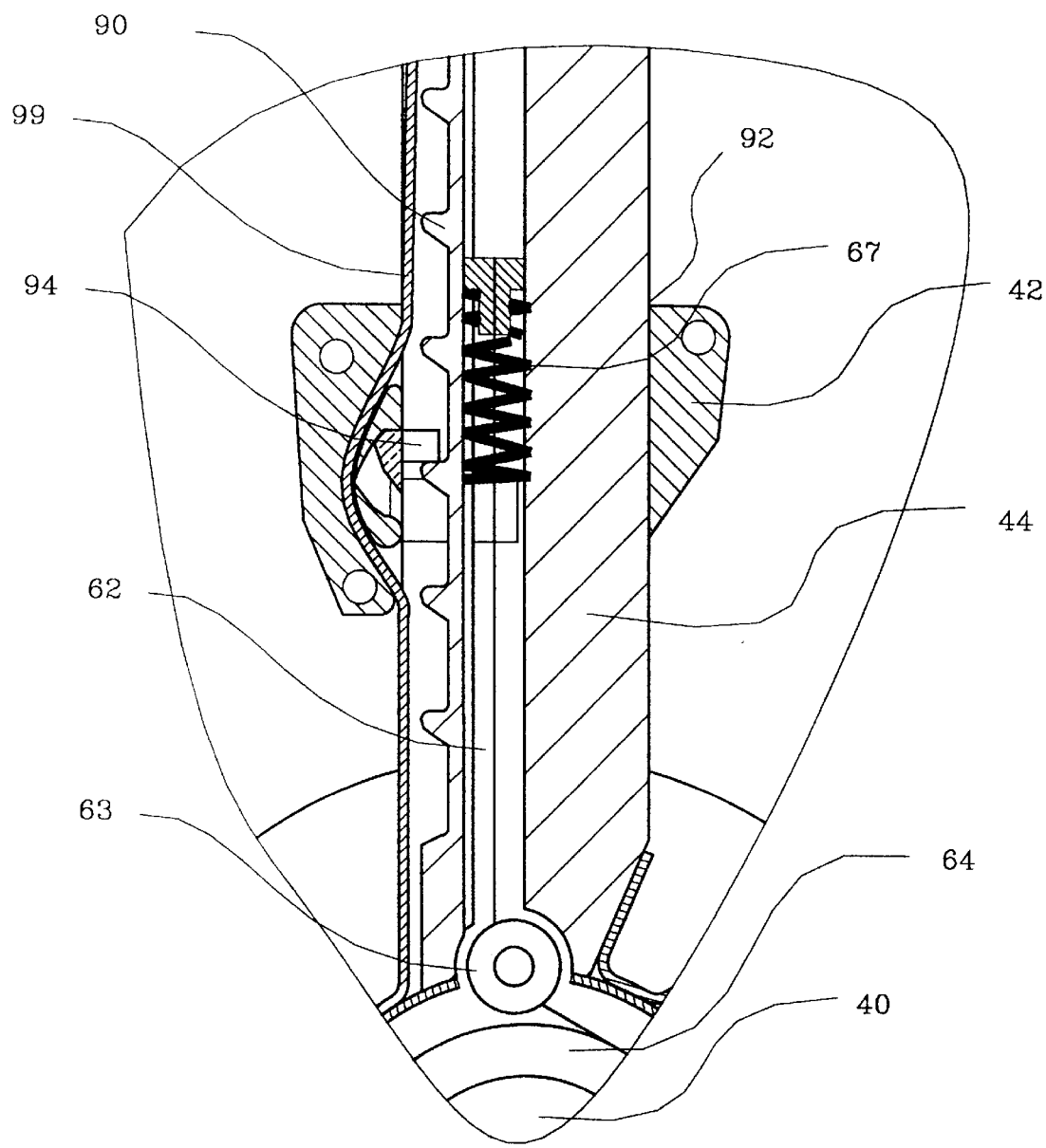
FIG. 5 is an enlarged fragmentary sectional view along the lines 5—5 of the sprocket of FIG. 4.
Figure 6:
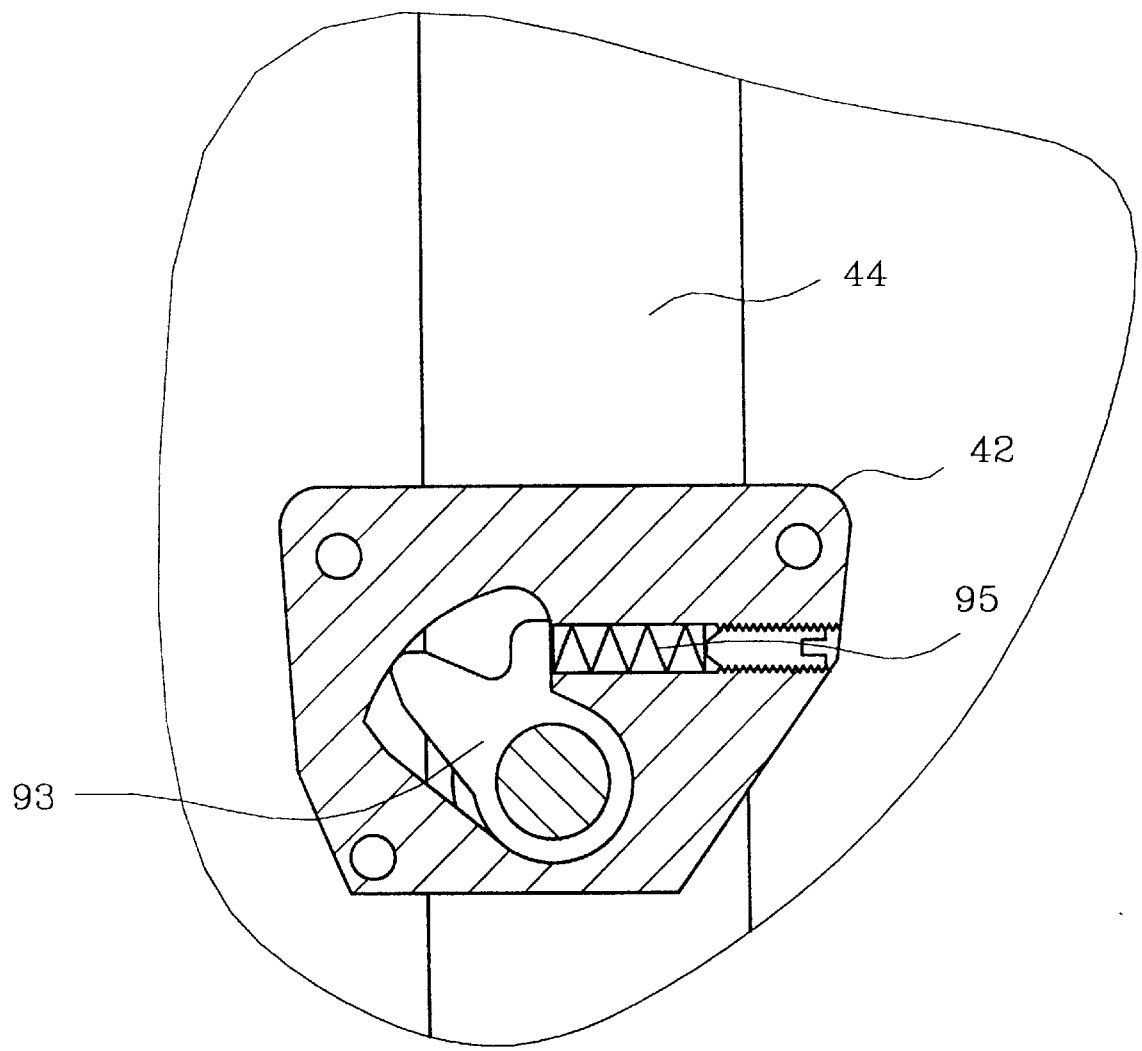
FIG. 6 is an enlarged fragmentary sectional view along the lines 6—6 of the sprocket of FIG. 4.

The position of sectors 42 on arms 44 is controlled by a shifting mechanism which is best illustrated in FIGS. 2B, 4 and 5. The shifting mechanism includes a number of flexible members, such as cables 62. One cable 62 extends from each of sector 42 to a spool 64 which is mounted for rotation on hub 40. Each cable 62 runs past a pulley 63 which is mounted slightly radially outward from spool 64. When spool 64 is rotated about hub 40 in a first sense, as indicated by arrow 66 (FIG. 2A), then flexible members 62 are wound onto spool 64, thereby drawing sectors 42 radially inwardly toward hub 40 and decreasing the effective diameter of variable sprocket 22.

When spool 64 rotates in a second sense on hub 40, opposite to the direction of arrow 66 then flexible members 62 are unwound from spool 64 and sectors 42 are pulled radially outwardly by springs 48, thereby increasing the effective diameter of variable sprocket 22.

Each of flexible members 62 is connected to its corresponding sector 42 by a spring 67 which may be mounted inside the sector 42. The combination of a spring 67 and a flexible member 62 can be described as a "resiliently extendable first member" extending between spool 64 and one of sectors 42. Springs 67 have a spring constant significantly higher than that of springs 48. Springs 67 permit spool 64 to rotate in the first sense even if one or more of sectors 42 is temporarily prevented from moving radially inwardly. As sectors 42 are freed for inward radial motion on arms 44 then springs 67 pull the freed sectors 42 into their new positions.

Spool 64 is connected to a shifting member which moves axially relative to hub 40 as spool 64 rotates on hub 40. In the illustrated embodiment the shifting member comprises a disk 68 which is mounted on hub 40. Disk 68 is connected to spool 64 so that it is rotatable together with spool 64 relative to hub 40. In the preferred embodiment shown in the drawings, the shifting member is moved axially by a pin 70 affixed to disk 68. Pin 70 engages a helical groove 72 in hub 40. A helical thread may be provided in place of pin 70.

Each radial position of sectors 42 corresponds to an angle of rotation of spool 64 relative to hub 40 and a corresponding axial position of disk 68. The positions of pin 70 and groove 72 could be reversed. Other mechanical means for moving disk 68 axially upon rotation of spool 64 also come within the broad scope of the invention.

When spool 64 is allowed to rotate in a sense opposite to arrow 66 so that sectors 42 move radially outwardly on arms 44 then disk 68 also rotates and moves axially outwardly relative to hub 40 in the direction of arrow 74. When sectors 42 are drawn radially inwardly by rotating disk 68 and spool 64 on hub 40 in the direction of arrow 66 then disk 68, in turn, moves axially inwardly on hub 40, in a direction opposite to arrow 74.

A holding mechanism 73 holds sectors 42 at a desired radial distance from axis 43. Holding mechanism 73 preferably comprises a releasable one-way clutch between shifting member 68 and hub 40. In the alternative, holding mechanism 73 may comprise a stop, as described below.

Holding mechanism 73 preferably comprises a pawl member 78 pivotally mounted to disk 68. Pawl member 78 comprises a pawl 78A which engages ratchet teeth 79 on hub 40. Pawl member 78 is biased so as to keep pawl 78A engaged with ratchet teeth 79. When pawl 78A is engaged with ratchet teeth 79 then disk 68 is free to turn relative to hub 40 in the direction of arrow 66. Disk 68 is prevented from rotating in a direction opposite to arrow 66 by pawl member 78. Pawl 78A engages ratchet teeth 79 so as to hold disk 68 and spool 64 so that sectors 42 cannot move radially outwardly. Springs 48 (in combination with a locking mechanism described below) prevent sectors 42 from moving radially inwardly. Other releasable one-way clutch mechanisms could be used in place of pawl member 78 and ratchet teeth 79.

Sectors 42 can be allowed to move radially outwardly by briefly releasing holding mechanism 73. This makes disc 68 and spool 64 free to turn on hub 40 so that springs 48 can pull sectors 42 outwardly. Where holding mechanism 73 comprises a ratchet, as described above, there is preferably one ratchet tooth 79 corresponding to each desired position of sectors 42. Sectors 42 can therefore be moved one step outwardly by moving pawl 78A by one ratchet tooth 79 in the direction opposite to arrow 66. A release mechanism is provided to briefly release holding mechanism 73.

In the preferred embodiment of the invention, holding mechanism 73 can be briefly released by a release mechanism comprising a release member 88 pivotally mounted to frame 26. Release member 88 has an engaged position wherein an end 88A projects into the path of a bar or "release arm" 78B projecting from a second end of pawl member 78 and a disengaged position wherein release member 88 does not contact bar 78B. Release member 88 is biased toward its disengaged position by, for example, a spring. A cable 89 is provided to move release member 88 between its engaged and disengaged positions. Cable 89 may be connected to a manual control lever or to an electromechanical actuator.

Sectors 42 may be shifted one step outwardly by moving release member 88 into its engaged position as shown by arrow 101 (FIG. 10A) while variable sprocket 20 is turning as indicated by arrow 102. As it is carried around axis 43 on disk 68, bar 78B of pawl member 78 will eventually contact end 88A of release member 88. When this happens, pawl 78A is disengaged from ratchet teeth 79 as shown by arrow 104 (FIG. 10B) thereby freeing disk 68 to rotate relative to hub 40. While disk 68 is freed, springs 48 can pull sectors 42 outwardly.

As release member 88 trips pawl member 78 disk 68 continues to rotate past release member 88. Bar 78B is quickly carried away from release member 88. As soon as bar 78B is free of release member 88 then pawl 78A is biased back into contact with ratchet teeth 79. In general, this happens quickly enough that pawl 78A engages the next ratchet tooth 79 as shown in FIG. 10C. After pawl 78A has been released, release member 88 is returned to its disengaged position. Pawl 78A then remains engaged with the next ratchet tooth 79.

If desired, release member 88 can be held in its engaged position. If this is done then pawl 78A is disengaged from ratchet teeth 79 once in each revolution of variable sprocket 22. Each time pawl 78A is disengaged it moves by one tooth along ratchet teeth 79 until sectors 42 have moved radially outwardly to the end of their travel.

As an alternative to a releasable one-way clutch mechanism, the holding mechanism which holds sectors 42 in position may comprise an adjustable stop member (not shown) located outwardly adjacent disk 68. The stop member can be positioned to prevent shifting member 68 from moving axially in the direction of arrow 74 past the position of the stop member. Sectors 42 are therefore held in place. The stop member can be moved in the direction of arrow 74 to allow springs 48 to pull sectors 42 radially outwardly. If a stop member is used for holding mechanism 73 then a thrust bearing is preferably located on disk 68 adjacent the stop member. Moving the stop member outwardly permits springs 48 to pull sectors 42 so as to move sectors 42 outwardly until disk 68 is once again pressed against the stop member.

A detent mechanism (not shown) may be provided between shifting member 68 and hub 40 to help to better retain shifting member 68 in desired positions against the force exerted by springs 48. A detent mechanism is not generally necessary when holding mechanism 73 comprises a one-way clutch mechanism, as described above, but is preferred when the holding mechanism comprises a movable stop member. The detent mechanism holds shifting member 68 in preferred positions so that a stop member does not need to withstand all of the forces exerted by springs 48.

The detent mechanism may comprise a spring loaded ball on shifting member 68, the ball being engageable in one of a number of indentations in hub 40. The forces driving shifting member 68 outwardly are greater when shifting member 68 is in its inward positions (where springs 48 are almost fully extended) than when shifting member 68 is in its outward positions. Preferably the indentations engaged by the ball when shifting member 68 is in axially inward positions on hub 40 are deeper than those indentations engaged when shifting member 68 is in axially outward positions. so that the force that a stop needs to exert on shifting member 68 to keep shifting member 68 from moving axially outwardly is relatively constant.

Sectors 42 may be drawn radially inwardly by operating a braking mechanism 81 on frame 26 to brake the rotation of disk 68 for a short period while hub 40 is allowed to continue to rotate relative to frame 26. Braking the rotation of disk 68 past frame 26 turns disk 68 relative to hub 40 in the direction of arrow 66. Springs 67 allow shifting member 68 to turn relative to hub 40 even if flexible member 28 and/or the locking mechanism described below are preventing motion of certain sectors 42 with which flexible member 28 is engaged. If a sector 42 is prevented from moving while flexible members 62 are being drawn inwardly onto spool 64 then that sector's spring 67 stretches. When that sector 42 comes out of engagement with flexible member 28 then spring 67 pulls that sector 42 inwardly into its desired position.

Figures 9A, 9B:
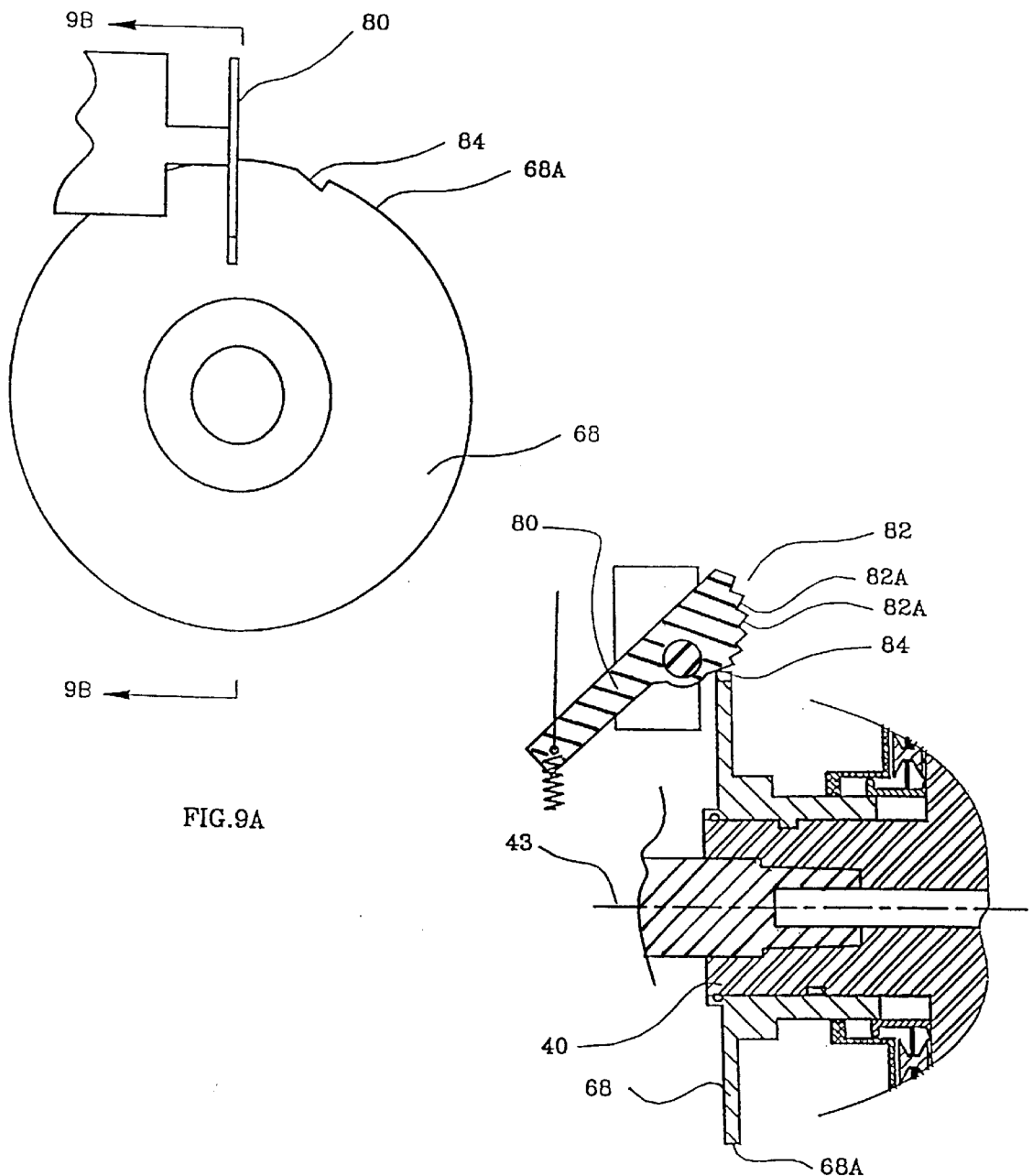
Figure 10D:
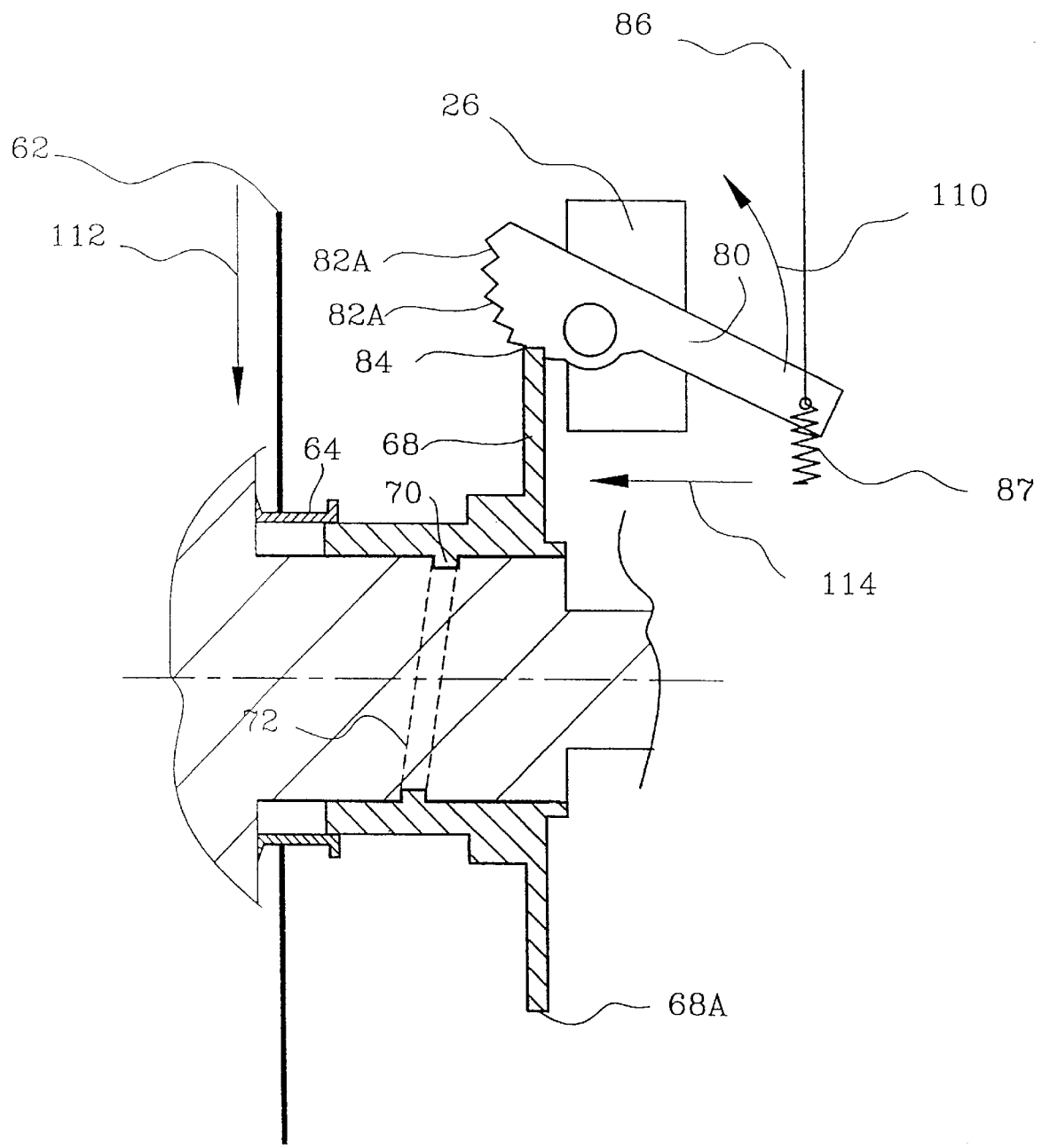

Braking mechanism 81 may comprise a brake member 80, which is pivotally mounted to frame 26 adjacent disk 68. The end of brake member 80 adjacent shifting member 68 comprises a number of steps 82. Each step 82 comprises a shifting face 82A which is generally parallel to an edge 68A of disk 68 (FIGS. 9A, 9B, 10D). Edge 68A of disk 68 has one or more notches 84.

As shown best in FIG. 10D, the position of brake member 80 is adjusted by means of a cable 86 which can pivot brake member 80 downwardly in the direction of arrow 110 against a bias force exerted by, for example, a spring 87. Cable 86 may be operated by a manual control lever or by a suitable electromechanical actuator.

One shifting face 82A of brake member 80 may be brought to bear against edge 68A of disc 68 by pulling on cable 86. Which one of shifting faces 82A contacts disk edge 68A depends upon the current axial position of disk 68 on hub 40. Disc 68 continues to rotate past brake member 80 until shifting face 82A drops into one of notches 84 thereby arresting the rotation of disc 68 relative to brake member 80. As hub 40 continues to turn, flexible members 62 are wound onto spool 64 (which is braked together with disk 68) thereby pulling sectors 42 inwardly as indicated by arrow 112. The relative rotation of disk 68 and hub 40 also causes disc 68 to move axially along hub 40, as described above, in a direction away from brake member 80 (as shown by arrow 114). When disc 68 moves axially past the end of shifting face 82A, shifting face 82A becomes disengaged from notch 84 and disc 68 is no longer prevented from rotating with hub 40.

Holding mechanism 73 prevents disc 68 from rotating in a sense which would allow it to move axially outwardly back to its initial position in the direction of arrow 74. The length of shifting faces 82A and the pitch of helical groove 72 are preferably selected so that sectors 42 are drawn inwardly by one increment (e.g. pawl 78A moves by one ratchet tooth 79) each time brake member is engaged with a notch 84.

Figures 8A, 8B:
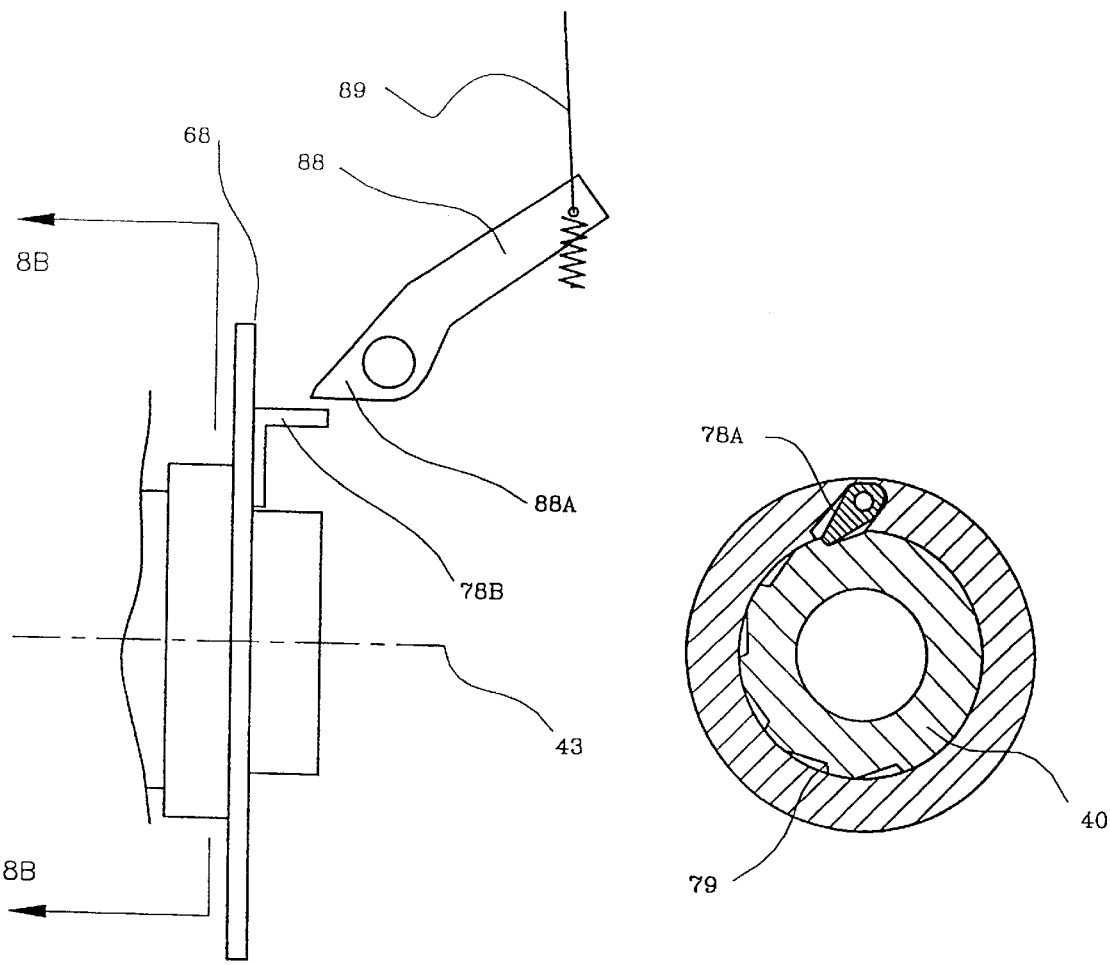
FIGS. 8A and 8B are respectively a schematic fragmentary side elevational view and a longitudinal section through the hub portion of a sprocket according to the invention, both illustrating one embodiment of a one-way clutch holding mechanism; and, FIGS. 9A and 9B are respectively a schematic fragmentary side elevational view and a longitudinal section through the hub portion of a sprocket according to the invention, both illustrating one embodiment of a braking mechanism for increasing the effective diameter of a variable sprocket; and, FIGS. 10A, 10B, 10C and 10D are schematic views illustrating steps in changing the ratio of the transmission of the invention.

FIG. 8B shows the position of pawl 78A when sectors 42 are in their radially innermost positions. When sectors 42 are in their radially innermost positions then disk 68 is moved axially on hub 40 far enough away from brake member 80 that none of shifting faces 82A can be engaged in a notch 84.

It can be appreciated that the system described herein is advantageous in that very little power is required to position brake member 80 or release member 88. Energy for moving sectors 42 comes from the motive force that is driving the rotation of variable sprocket 22 (e.g. from a pedal assembly connected to variable sprocket 22 and pedalled by a bicycle rider). Consequently, variable speed transmission 20 is well suited to being electronically controlled. An electronic control system does not need to apply large mechanical forces to change the gear ratio of transmission 20 but merely needs to apply forces sufficient to move release member 88 and brake member 80 between their engaged and disengaged positions.

Transmission 20 should include locking means for holding sectors 42 in position when they are under load. In a preferred embodiment of the invention the locking means comprises teeth 90 on the leading edges of arms 44. Arms 44 pass through channels 92 which extend through sectors 42. Each sector 42 has a locking member 93 pivotally mounted within it. Each locking member 93 comprises a hook 94. Locking member 93 pivots between a disengaged (or "unlocked") position wherein hook 94 does not engage teeth 90 and an engaged (or "locked") position wherein hook 94 engages teeth 90 thereby preventing sector 42 from being displaced radially inwardly along its arm 44. Typically locking member pivots through an angle of about 17 degrees between its engaged and disengaged positions.

Hook 94 is biased out of engagement with teeth 90 by a spring 95. Teeth 45 project from a body 97 connected to locking member 93. When teeth 45 are engaged with flexible member 28 and are under load then body 97 pivots its associated locking member 93 against the force exerted by spring 95 to engage hook 94 with teeth 90. The tension in chain 28 acting on teeth 45 tends to maintain locking hook 94 of locking member 93 engaged with teeth 90.

The inward faces of teeth 90 are preferably ramped so that sectors 42 can move outwardly even when locking members 93 are not completely disengaged. When locking members 93 are in their engaged positions then sectors 42 cannot be moved radially inwardly. The locking mechanism is preferably protected from contamination with dirt. This may be done, for example, by providing a flexible plastic sleeve 99 (FIG. 5) to enclose teeth 90.

When transmission 20 is under load and sectors 42 are being shifted in a radially inward direction then the engagement of the locking mechanisms holds each sector 42 in place until the rotation of sprocket 22 has carried that sector out of engagement with flexible member 28. Once teeth 45 have disengaged from chain 28 then spring 95 releases hook 94 of locking member 93 from teeth 90 and spring 67 pulls sector 42 one step inwardly.

Those skilled in the art will readily realize after reading this specification that many other locking means could be used in this invention. The locking means may be any suitable releasable device which prevents a sector 42 from moving radially inwardly when that sector 42 is applying force to flexible member 28. For example, the locking means might comprise sectors mounted so that entire sectors can can pivot on arms 44 to engage or disengage a hook on the sector with teeth on the arms.

Figure 3:
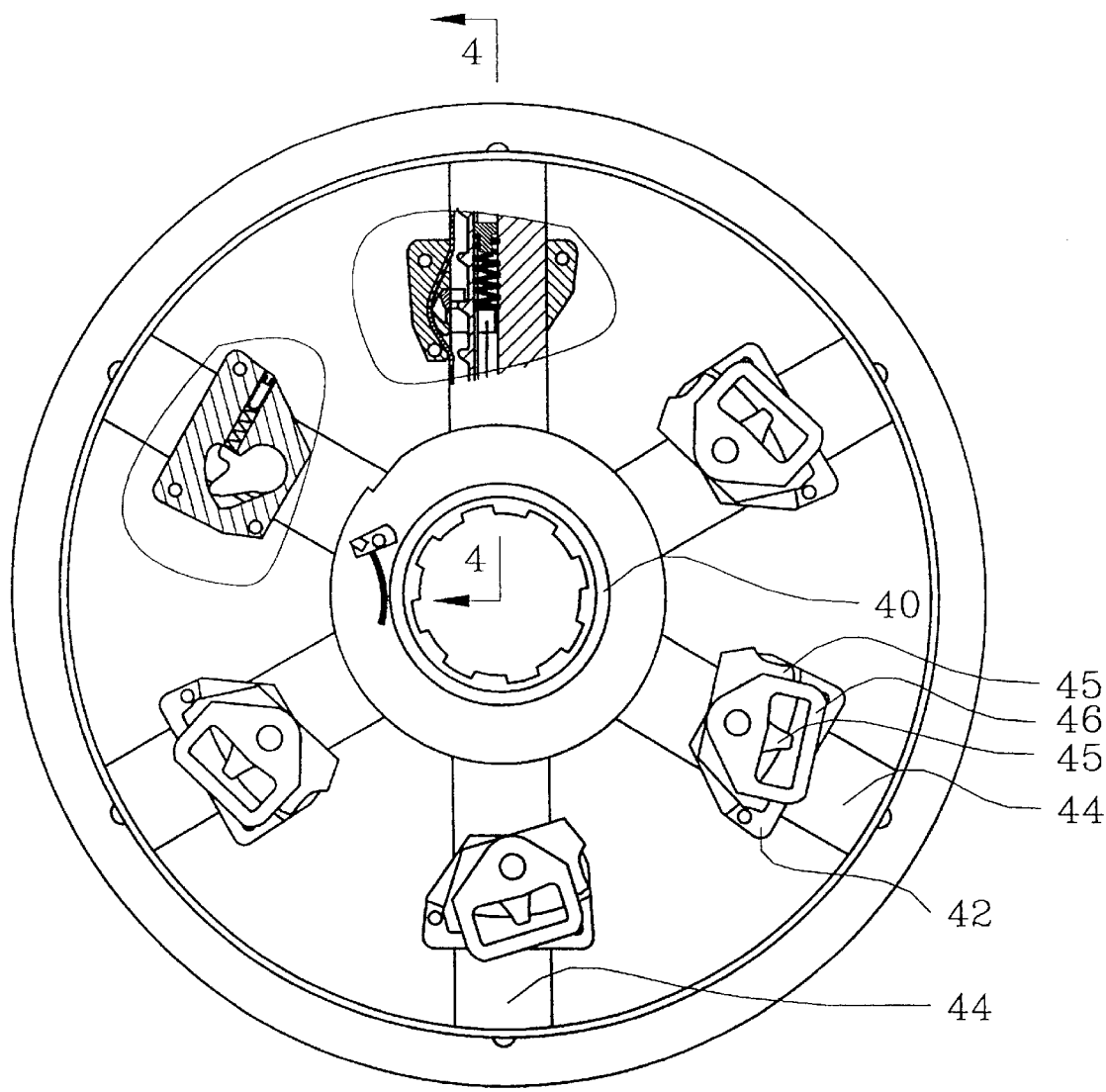
FIG. 3 is a side elevational view of a variable sprocket according to the invention.

A driven variable sprocket is constructed and operates in a manner substantially identically to the driving variable sprocket 22 which is described above with the exception that the forces exerted by flexible member 28 on sectors 42 in a driven sprocket tend to rock sectors 42 in the opposite polar direction on arms 44 than would be the case for sectors 42 on a driving variable sprocket. Consequently, the locking mechanisms in a driven sprocket should hold sectors 42 when they are being rocked forwardly (i.e. in the same direction as the direction of rotation of the driven sprocket) on arms 44. When transmission 20 is a bicycle transmission then frame 26 generally passes to one side of the driving sprocket and to the opposite side of the driven sprocket. As brake member 80 and release member 88 mount to frame 26, the shifting mechanisms on the driving and driven variable sprockets in a bicycle will generally be mirror images of each other. As shown in FIG. 3, a driven sprocket may be splined so that it can be used in place of the rear cassette on a bicycle equipped with a standard freewheel hub.

In a preferred application of the invention, sensors measure the rate of rotation of variable sprocket 22 and the tension in flexible member 28. Data from the sensors is provided to a computer running a software program. The software program determines whether the ratio of transmission 20 is optimum, should be increased, or should be decreased. If the software determines that the ratio should be increased or decreased then the software causes the computer to operate an electromechanical actuator to move brake member 80 and/or release member 88 on one or more sprockets of the transmission to change the gear ratio up or down appropriately.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A variable diameter sprocket for a power transmission, the sprocket comprising:
    (a) a hub mountable for rotation on a frame;
    (b) a plurality of sectors mounted to and radially displaceable relative to the hub, the sectors biased away from the hub and adapted to engage a flexible drive member; and,
    (c) a shifting mechanism comprising:
        (i) a shifting member on the hub, the shifting member movable axially in a first direction in response to rotation relative to the hub in a first sense and movable axially in a second direction opposite to the first direction in response to rotation relative to the hub in a second sense;
        (ii) a plurality of first members, each first member having one end connected to one of the sectors and another end coupled to the shifting member, wherein rotation of the shifting member in the first sense draws the sectors toward the hub and rotation of the shifting member in the second sense allows the sectors to move away from the hub;
        (iii) a releasable holding mechanism for preventing the shifting member from moving in the second direction; and,
        (iv) a brake mountable on the frame for causing the shifting member to turn in the first sense relative to the hub by braking rotation of the shifting member relative to the frame.

2. The variable diameter sprocket of claim 1 wherein the flexible member comprises a roller chain and the sectors each comprise one or more teeth adapted to engage a roller chain.

3. The variable diameter sprocket of claim 1 wherein the plurality of first members are each connected to a corresponding one of the sectors by a first spring.

4. The variable diameter sprocket of claim 3 wherein the sectors are each biased away from the hub by a second spring.

5. The variable diameter sprocket of claim 4 wherein the sectors are each connected to a corresponding one of the second springs by a second flexible member passing over a sheave radially outward from the sector.

6. The variable diameter sprocket of claim 4 wherein the sectors are slidably engaged on arms extending radially from the hub.

7. The variable diameter sprocket of claim 1 wherein the sectors comprise a locking mechanism adapted to lock the sectors against radially inward motion.

8. The variable diameter sprocket of claim 7 wherein each of the arms comprises first teeth projecting from its leading edge and the locking mechanism comprises a movable locking member in each sector, the locking member comprising a hook which can be engaged or disengaged from the first teeth by moving the locking member.

9. The variable diameter sprocket of claim 8 wherein the teeth are linked to the locking member and, when the teeth are under load, the locking member is biased toward its engaged position.

10. The variable diameter sprocket of claim 7 wherein the releasable holding mechanism comprises a releasable one-way clutch connecting the shifting member and the hub.

11. The variable diameter sprocket of claim 10 wherein the one way clutch comprises a pawl on the shifting member engageable with one of a plurality of ratchet teeth on the hub.

12. The variable diameter sprocket of claim 11 wherein the holding mechanism is releasable by moving a release member from a disengaged position to an engaged position wherein, upon rotation of the sprocket, the release member contacts a bar linked to the pawl and disengages the pawl from the ratchet tooth.

13. The variable diameter sprocket of claim 11 wherein the shifting member is threadedly engaged with the hub.

14. The variable diameter sprocket of claim 1 wherein the brake comprises a notch in a peripheral edge of the shifting member and a braking member engageable in the notch.

15. The variable diameter sprocket of claim 14 wherein the braking member comprises a plurality of steps, each step comprising a face engageable in the notch when the shifting member is at an axial position corresponding to the face.

16. The variable sprocket of claim 1 wherein the holding mechanism comprises a movable stop member at an axially adjustable position adjacent the shifting member.

17. The variable diameter sprocket of claim 16 wherein the stop member bears against a thrust bearing on the shifting member.

18. The variable diameter sprocket of claim 17 comprising a detent mechanism associated with the shifting member for retaining the shifting member in one of a plurality of desired axial positions on the hub.

19. The variable diameter sprocket of claim 18 wherein the detent mechanism comprises a spring loaded ball engageable in one of a plurality of indentations and axially inward indentations in the plurality of indentations on the hub are deeper than axially outward indentations in the plurality of indentations whereby the detent mechanism holds the shifting member with greater force in axially inward positions on the hub than in axially outward positions on the hub.

20. A variable diameter sprocket assembly for use in a power transmission, the sprocket assembly comprising:
 (a) a hub mountable for rotation on a frame;
 (b) a plurality of sectors mounted to and radially displaceable relative to the hub, the sectors biased away from the hub and including grips adapted to engage a flexible drive member;
 (c) a locking mechanism associated with each of the sectors, the locking mechanism movable between a locked position wherein radially inward motion of the sector is prevented and an unlocked position wherein the sector can be moved radially inwardly; and,
 (d) a shifting mechanism comprising:
  (i) a plurality of resiliently extendable first members, each first member extending between one of the sectors and a spool mounted for rotation on the hub wherein rotation of the spool member in a first sense draws the sectors toward the hub and subsequent rotation of the shifting member in a second sense allows the sectors to move away from the hub;
  (ii) a shifting member on the hub, the shifting member connected for rotation with the spool, the shifting member movable axially in a first direction in response to rotation relative to the hub in the first sense and movable axially in a second direction opposite to the first direction in response to rotation relative to the hub in the second sense;
  (iii) a releasable holding mechanism for preventing the spool from rotating in the second sense; and,
  (iv) a braking mechanism for briefly causing the shifting member to turn in the first sense relative to the hub.

21. The sprocket assembly of claim 20 wherein the holding mechanism comprises a one way clutch associated with the hub and the shifting member.

22. The sprocket assembly of claim 21 wherein the one-way clutch comprises a release arm and the sprocket assembly comprises a release member having a disengaged position wherein the release member does not contact the release arm and an engaged position wherein the release member can displace the release arm to permit motion of the spool in the second sense.

23. The sprocket assembly of claim 22 wherein the release arm comprises a bar extending axially outwardly from the shifting member.

24. The sprocket assembly of claim 23 wherein the one way clutch comprises a pawl pivotally mounted to the shifting member, the pawl engageable with one of a plurality of ratchet teeth on the hub.

25. The sprocket assembly of claim 24 wherein the braking mechanism comprises a braking member pivotally mounted to a frame adjacent the shifting member, the braking member engageable with the shifting member.

26. The sprocket assembly of claim 20 wherein the braking mechanism comprises a braking member pivotally mounted to a frame adjacent the shifting member, the braking member engageable with the shifting member.

27. The sprocket assembly of claim 26 wherein the braking member comprises a stepped edge, the edge comprising a plurality of steps each one of the steps comprising an edge engageable in a notch in the shifting member when the shifting member is at an axial position corresponding to the one of the steps.

28. The sprocket assembly of claim 27 wherein the locking mechanism comprises a movable locking member in each sector, the locking member comprising a hook which can be engaged or disengaged with lock teeth on members connected to the hub.

29. The sprocket assembly of claim 28 wherein the locking mechanism comprises bias means biasing the locking member toward a position wherein the hook is disengaged with the lock teeth.

30. The sprocket assembly of claim 29 wherein, in each sector, the grip is connected to the locking member so that the locking member is moved to engage the hook with the lock teeth when the grip is exerting force on a flexible member.

31. The sprocket assembly of claim 30 wherein the grip comprises teeth adapted to engage a roller chain.

* * * * *